United States Patent Office 2,705,837
Patented Apr. 12, 1955

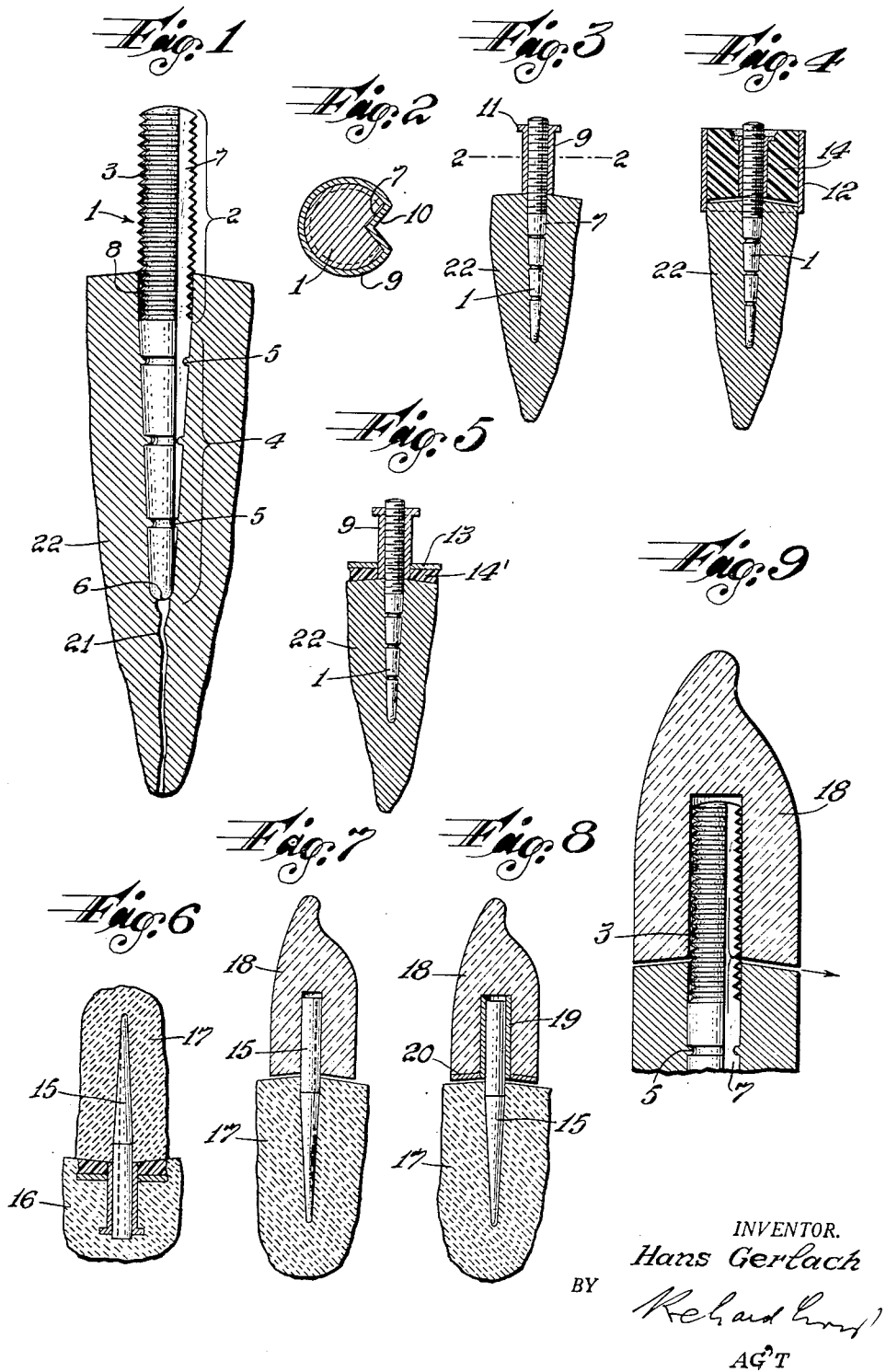

2,705,837

APPARATUS FOR MAKING A TOOTH PROSTHESIS

Hans Gerlach, Berlin-Dahlem, Germany, assignor of one-half to Frico G. m. b. H. Gold- und Silber-Scheide-Anstalt, Munich, Germany Original application July 15, 1950, Serial No. 174,042. Divided and this application September 29, 1951, Serial No. 248,916

Claims priority, application Switzerland August 2, 1949

4 Claims. (Cl. 32—13)

This invention relates to an apparatus for making a tooth prosthesis having a bore for fitting the same over a pin to be fixed in the natural root of a tooth, the present application being a division from the copending application Ser. No. 174,042 filed by me and Adolf Fritz on July 15, 1950.

My apparatus includes a root pin which consists of a cylindrical upper portion and a slightly tapered lower portion. The latter portion fits accurately into the bed excavated in a natural tooth by means of a precision burr having the same slight taper so that an artificial crown or the like is reliably held in position. The precise fit of the pin, as a rule, makes it unnecessary to employ a root ring.

Root pins which with the aid of corresponding special burrs are made to fit exactly into excavated bores are known but their objectionable feature is that the portion thereof reaching into the root canal is provided with an offset disclike thickening for sealing the bore of the root and keeping the cast-on material away from the portion of the pin that is within the canal.

In practical application it has been found that pins having such a disclike collar have certain disadvantages which do not appear when a pin according to the invention is used. The disclike collar of the pin portion extending into the root canal requires different lengths of the bore shaft corresponding to the condition and size of the root canal, so that burrs and pins of different dimensions are needed. Furthermore, pins of this class must be very carefully handled since the depth of the shaft is positively limited by the collar of the burr and cannot be reduced or increased.

To simplify work on the model, that is, the reproduction of the jaw in plaster, and also in the mouth of the patient, and, thus, to prevent damage to the model during working, I have developed auxiliary members of the same shape and dimensions as the root pin, but possessing a smooth surface, which take the place of the root pin during work on the model.

According to the invention, both the root pin and its auxiliary member are provided with a continuous longitudinal groove to secure the pin in the root canal and the part of a denture carried by the pin against torsion. The accessories, as cannulae, etc., attachable to the pin and the auxiliary member are shaped accordingly, according to the invention, possess interior keys which fit into the groove like a tongue. The cannulae may be constructed as impression cannulae for model work, or as shell cannulae for casting on a crown structure and baking solid crowns of porcelain or plastics around such shell cannulae.

The invention is illustrated by way of example in the accompanying drawing, in which Figure 1 is a longitudinal section through a root pin according to the invention, shown seated in a root canal;

Fig. 2 is a cross section taken in the plane of the line 2—2 of Fig. 3, drawn to enlarged scale;

Fig. 3 is a view similar to that of Fig. 1 but drawn to a reduced scale, illustrating a shell cannula;

Fig. 4 is a section taken in elevation and is explanatory of a method of making a tooth prosthesis;

Fig. 5 is a section similar to that of Fig. 4 and is explanatory of a modified method;

Fig. 6 is explanatory of a method of making a so-called impression and a plaster or plastic reproduction, using an auxiliary member;

Fig. 7 illustrates an auxiliary member supporting a tooth prosthesis;

Fig. 8 illustrates an auxiliary member supporting a cannula which in turn supports a solid crown prepared for burning; and Fig. 9 is a longitudinal section of the upper portion of the root pin with part of a denture arranged thereon.

According to Fig. 1, the root pin 1 comprises an upper cylindrical portion 2 provided with a fine thread 3 and a lower slightly tapered conical portion 4 having a plurality of transverse grooves 5. The pin 1 terminates in a blunt point 6 and is provided with a longitudinal groove 7 extending to the point 6.

The pin 1 anchored in the bore shaft 8 permits accurate molding of the root face positioned far below the level of the tooth face to act as support for an artificial crown, and also the true reproduction of the root face relative to the pin. The groove forms a safe guide for an impression cannula 9 by means of which the exact position of the pin relative to the root face may be reproduced by the impression method.

The cannula 9 has an interior key 10 which fits into the groove 7 of the pin 1. In the embodiment shown in Fig. 2 the groove is of wedge-shaped cross section, though it may have any other suitable form.

When taking the impression and removing same from the patient's mouth, the pin and the cannula previously put on the pin are simultaneously taken out from the mouth. Then, the pin is removed from the impression and an auxiliary member 15 is inserted in the cannula instead, and the free end portion of the auxiliary member is held in a plaster or cement mold 17, whereupon the artificial crown 18 is constructed on the model and finally placed on the root pin 1 in the mouth, the groove 7 serving as a guide to insure precise fit.

During the impression-taking step, the ring 12, if the ring method can be applied, or the impression tray 13 with the guide cannula 9 is pushed over the pin 1 and charged with the impression material 14 for copying the root face, upon which the entire structure is lowered under pressure. If necessary, the impression may be taken off for checking and recharging and may, owing to the guiding groove on the root pin 1, safely restored in proper position on the root face until a satisfactory impression is obtained.

When applying the direct method of modeling a wax crown 18 in the mouth immediately above the pin 1 cemented in the root 22 of a tooth, it was not possible hitherto to protect the delicate wax model against the danger of being crushed during working. The usual employment of round pins, moreover, disadvantageously affected the fit of the crown, if modeling was possible at all. The guide groove 7, however, prevents rotation and clearly directs the crown 18 if it has to be temporarily removed from its pin and reinserted in the mouth for the completion of the work.

According to Fig. 3, the pin 1 is loosely introduced into the root canal and provided with an impression sleeve or cannula 9 possessing a collar 11. Depending on the particular conditions, an impression ring 12 (Fig. 4) or an impression tray 13 (Fig. 5) is placed on the pin 1 and charged with impression material 14 and 14', respectively. Then a plaster impression 16 is taken in known manner after the pin 1 together with the impression 14 or 14' has been removed from the patient's mouth, and the pin has been exchanged for a corresponding auxiliary member 15.

The cannula 9 remains in the plaster impression 16 and, together with the auxiliary member 15, serves to produce a plaster or cement mold 17 (Fig. 6). On the auxiliary member 15 disposed in the mold 17, a dental structure 18, for instance, a crown of porcelain, is built up (Fig. 7). For burning solid porcelain crowns, a shell 19 is placed over the pin end, and the crown 18 is burnt around the shell 19 (Fig. 8). The shell 19 may be fitted with a root pressure plate 20 of platinum.

After completion of the crown, the pin 1 is cemented in the canal 21 of the root 22 excavated by a precision burr, and excess binding material is discharged through the groove 7, as indicated by the arrow in Fig. 9.

This discharge of excess material is absolutely necessary to insure proper fitting and durability of all parts.

Due to this discharge, a pin may be seated at least 1½ mm. deeper in the root canal 21 than ordinarily with the same bore length. At present, the practitioner himself has to engrave discharge grooves, thereby impairing the fit and durability of these parts due to the formation of ridges and the notching effect.

Finally, the provision of the groove 7 affords extraordinary advantages if a pin breaks and has to be removed from the root canal 21, which is always a difficult task. The invention facilitates this operation by enabling the dentist to remove the cement in the direction of the groove by using a fine tool and so obtaining a point of application for a suitable forceps.

I claim:

1. In an apparatus for making a tooth prosthesis having a bore for fitting the same over a root pin to be fixed in a natural tooth, said apparatus comprising the root pin which consists of a cylindrical upper portion and a slightly tapered lower portion, the root pin being provided with a groove longitudinally extending throughout the length of said cylindrical portion and at least through a part of the length of said tapered portion, the base of the groove extending substantially parallel to the axis of the root pin, and at least a single cannula having an inner diameter substantially corresponding to the diameter of the cylindrical portion, the cannula being provided with an interior key corresponding, when viewed in cross section, to the groove in said cylindrical portion, the key being received in the groove of the cylindrical portion, the base of the key extending substantially parallel to the axis of the root pin, the cannula being thus adapted to slide on the cylindrical and tapered portions and being prevented from rotational displacements.

2. In the apparatus according to claim 1, said cylindrical portion being provided with a fine thread.

3. In the apparatus according to claim 1, the taper narrowing toward the free end of said lower portion, the base of the groove extending radially spaced from the axis of the root pin, the groove having a depth gradually diminishing toward said free end.

4. In the apparatus according to claim 1, said lower portion being spacedly provided with transverse ring-shaped grooves.

References Cited in the file of this patent

UNITED STATES PATENTS

| | | |
|---|---|---|
| 631,429 | Neil | Aug. 22, 1899 |
| 1,589,994 | Simmons | June 22, 1926 |